(12) United States Patent
Feng et al.

(10) Patent No.: US 11,617,301 B2
(45) Date of Patent: Apr. 4, 2023

(54) GARDEN TOOL AND POWER ASSEMBLY THEREOF

(71) Applicant: Globe (Jiangsu) Co., Ltd., Jiangsu (CN)

(72) Inventors: Shouchuan Feng, Jiangsu (CN); Wenhai Chen, Jiangsu (CN)

(73) Assignee: Globe (Jiangsu) Co., Ltd., Jiangsu (CN)

(*) Notice: Subject to any disclaimer, the term of this patent is extended or adjusted under 35 U.S.C. 154(b) by 575 days.

(21) Appl. No.: 16/722,895

(22) Filed: Dec. 20, 2019

(65) Prior Publication Data
US 2020/0196522 A1    Jun. 25, 2020

(30) Foreign Application Priority Data
Dec. 25, 2018   (CN) .......................... 201811594800.5

(51) Int. Cl.
*A01D 34/00* (2006.01)
*A01D 34/78* (2006.01)
(Continued)

(52) U.S. Cl.
CPC ............. *A01D 34/78* (2013.01); *A01D 34/64* (2013.01); *A01D 34/68* (2013.01); *A01D 34/81* (2013.01); *A01D 2101/00* (2013.01)

(58) Field of Classification Search
CPC ........ A01D 34/78; A01D 34/71; A01D 34/64; A01D 34/68; A01D 43/077; A01D 34/81
See application file for complete search history.

(56) References Cited

U.S. PATENT DOCUMENTS 5,317,860 A * 6/1994 Dunn ..................... A01D 34/71
                                                56/DIG. 8
5,819,513 A * 10/1998 Braun .................. A01D 34/828
                                                56/11.9
(Continued)

FOREIGN PATENT DOCUMENTS

EP         0501674 A1    9/1992
EP         3331056 A1    6/2018
(Continued)

OTHER PUBLICATIONS

European Search Report and Search Opinion in related European Patent Application No. 19218681.5 dated Apr. 16, 2020; 5 pages.

*Primary Examiner* — Hau V Phan
(74) *Attorney, Agent, or Firm* — Rooney IP, LLC (57) ABSTRACT

A power assembly and a garden tool having the power assembly. The power assembly includes a housing, a driving unit received in the housing and a power supplying unit received in the housing for powering the driving unit. The driving unit includes a driving motor and a control panel assembly located upon the driving motor. The housing has at least one heat dissipation air duct formed therein for airflow passing through the driving unit. The heat dissipation air duct has an air inlet for air intaking and an air outlet for air flowing out, and the air outlet is located at a bottom of the housing and open towards a lateral side of the housing. So that the airflow entering the housing through the air inlet can sequentially flow through the control panel assembly and the driving motor, and finally flows out the housing through the air outlet to take away the heat generated by the driving unit, the working temperature of the driving unit can be reduced and the working efficiency of the power assembly can be improved.

11 Claims, 8 Drawing Sheets

(51) Int. Cl.
*A01D 34/64* (2006.01)
*A01D 34/68* (2006.01)
*A01D 34/81* (2006.01)
*A01D 101/00* (2006.01)

(56) References Cited

U.S. PATENT DOCUMENTS

| | | | | |
|---|---|---|---|---|
| 7,540,132 | B2* | 6/2009 | Shimada | A01D 34/828 |
| | | | | 56/320.1 |
| 8,191,343 | B1* | 6/2012 | Hauser | A01D 69/02 |
| | | | | 56/11.9 |
| 9,093,868 | B2* | 7/2015 | Baxter | A01D 69/02 |
| 9,991,825 | B1* | 6/2018 | Ackerman | H02P 7/06 |
| 10,111,383 | B2* | 10/2018 | Yamaoka | A01D 34/81 |
| 2010/0175357 | A1* | 7/2010 | Keski-Luopa | A01D 43/077 |
| | | | | 56/203 |
| 2016/0183451 | A1* | 6/2016 | Conrad | A01D 34/66 |
| | | | | 56/10.2 R |
| 2017/0088010 | A1* | 3/2017 | Tonks | B60K 1/04 |
| 2017/0174047 | A1* | 6/2017 | French | B60H 1/00428 |
| 2018/0151854 | A1* | 5/2018 | Kubota | A01D 34/81 |
| 2018/0160620 | A1* | 6/2018 | Wang | A01D 34/00 |

FOREIGN PATENT DOCUMENTS

| | | |
|---|---|---|
| WO | 2013051972 A1 | 4/2013 |
| WO | 2018165513 A1 | 9/2018 |

* cited by examiner

GARDEN TOOL AND POWER ASSEMBLY THEREOF

CROSS-REFERENCE

The present application claims priority to CN patent application Ser. No. CN201811594800.5 filed on Dec. 25, 2018, the disclosure of which is incorporated by reference herein in its entirety.

TECHNICAL FIELD

The present invention relates to a power assembly and a garden tool having the power assembly.

BACKGROUND ART

The heat dissipation of the power assembly in the existing garden tools is carried out by passive heat dissipation or active heat dissipation. For small garden tools such as lawn mowers, most of them use active heat dissipation. In the prior art, the active heat dissipation lawn mower has a power assembly, a lower cover located below the power assembly and a blade disposed under the lower cover. The lawn mower also has an air outlet disposed at a location where the blade is disposed, so that the heat can be dissipated by the suction wind formed by the rotation of the blade and the grass clippings, dust and some other articles attached to the surface of the blade can be blown away in time.

However, the grass sap produced by the lawnmower mowing the grass will mix with the dust and condense on the lower cover and the blade. Therefore, the suction wind generated by the rotation of the blade alone cannot completely remove the condensed sap and dust on the blade. The high-pressure water gun is usually used to clean the blade. When the high-pressure water gun is used to clean the blade, since the air outlet of the power assembly is disposed on the bottom of the lower cover, a large amount of water enters into the power assembly, serious problems such as short-circuiting of the motor of the power assembly and fires caused by the water during the re-use of the lawnmower. Meanwhile the power assembly cannot be applied to garden tools with high heat, high current, high torque and the like because of the heat dissipation structure in existing lawnmower.

Therefore, it is necessary to provide an improved power assembly for a garden tool to solve the above problems.

SUMMARY OF INVENTION

It is an object of the present invention to provide a power assembly with highly efficient heat dissipation and high power usage, and a garden tool with the power assembly has a good waterproof performance.

To achieve the above objectives, the present invention provides a power assembly comprising a housing, a driving unit received in the housing and a power supplying unit received in the housing for powering the driving unit, the driving unit including a driving motor and a control panel assembly located upon the driving motor, the housing having at least one heat dissipation air duct formed therein for airflow passing through the driving unit, and the heat dissipation air duct having an air inlet for air intaking and an air outlet for air flowing out, and the air outlet being located at a bottom of the housing and open towards a lateral side of the housing.

In some embodiments, the heat dissipation air duct has a first air passage for airflow passing through, and the first passage has a first air inlet and a first air outlet disposed at two opposite ends thereof, and the first air inlet is the air inlet disposed on a side of the housing, and the first air outlet is open towards the driving unit.

In some embodiments, the first air outlet is open towards the control panel assembly and located as same height as the control panel assembly.

In some embodiments, the heat dissipation air duct has a second air passage communicating with the first air passage for air flowing out, and the second passage includes a second air inlet and a second air outlet located at two opposite ends thereof, and the second air outlet is the air outlet open towards the lateral side of the housing.

In some embodiments, the housing has a plurality of ribs located in the second air passage for determining the flowing direction of the airflow, and the second air inlet is disposed at the bottom of the housing.

In some embodiments, the power assembly includes an air guiding cover located in the heat dissipation air duct, and the driving motor is surrounded by the air guiding cover and the control panel assembly is disposed at the top of the air guiding cover.

In some embodiments, the air guiding port has a plurality of supporting portions extending upwardly therefrom for supporting the control panel assembly.

In some embodiments, the air guiding cover has an air guiding port disposed at the top thereof, and the air guiding port is surrounded by the supporting portions, and the control panel assembly is located between the air guiding port and the first air outlet.

In some embodiments, the housing has a first and second receiving cavities adjacent to each other, and the driving unit and the air guiding cover are received in the first receiving cavity, and the power supplying unit is received in the second receiving cavity.

In some embodiment, the second receiving cavity is communicating with the first receiving cavity and the housing has a venting hole located at a bottom of the second receiving cavity for the airflow flowing out.

In order to achieve the above object, the present invention also provides a garden tool operable for use with the power assembly described above, comprising a chassis and a working assembly received in the chassis and driven by the power assembly, and the air inlet and air outlet of the power assembly are located above the chassis and the air outlet being open towards a lateral side of the chassis.

The air outlet is opened towards the lateral side of the housing, so that the airflow entering the housing through the air inlet can sequentially flows through the control panel assembly and the driving motor, and finally flows out the housing through the air outlet to take away the heat generated by the driving motor and the control panel assembly, the working temperature of the power assembly can be reduced and the working efficiency of the power assembly can be improved.

DESCRIPITIOIN OF EMBODIMENTS

In order to make the objects, technical solutions and advantages of the present invention more clearly, the present invention will be described in detail below with reference to the drawings and specific embodiments.

Figure 1:
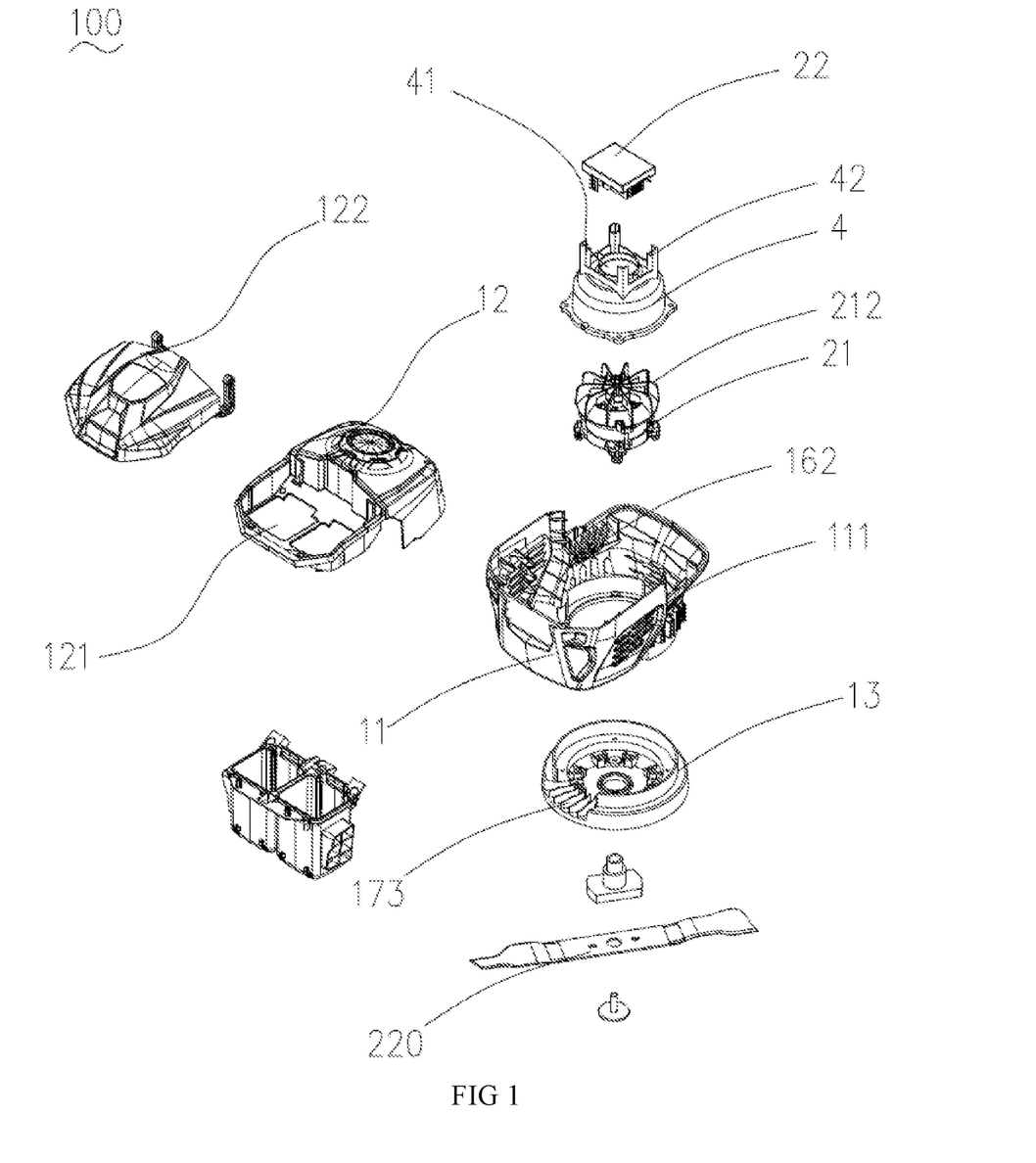
FIG. 1 is an exploded and perspective view of a power assembly without a power supply unit in accordance with an embodiment of the present invention.
Figure 2:
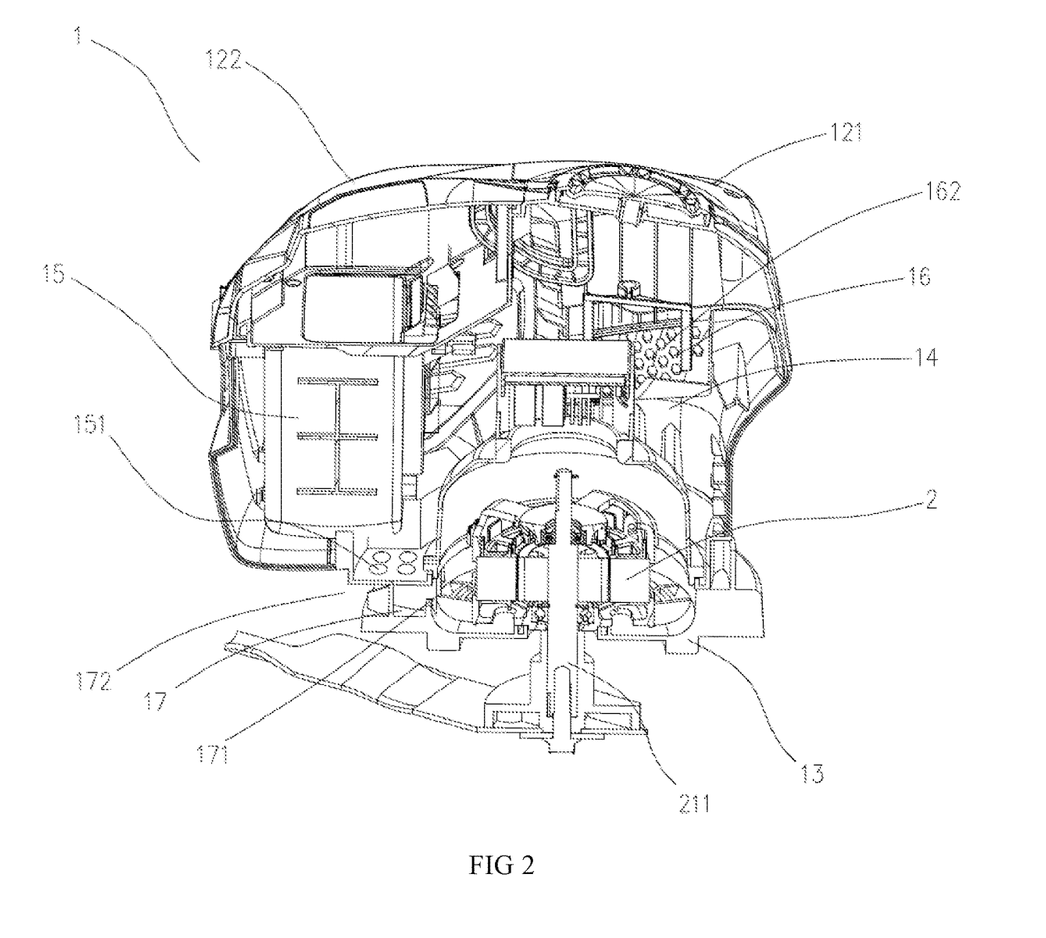
FIG. 2 is a cross-sectional view of the power assembly shown in FIG. 1.
Figure 3:
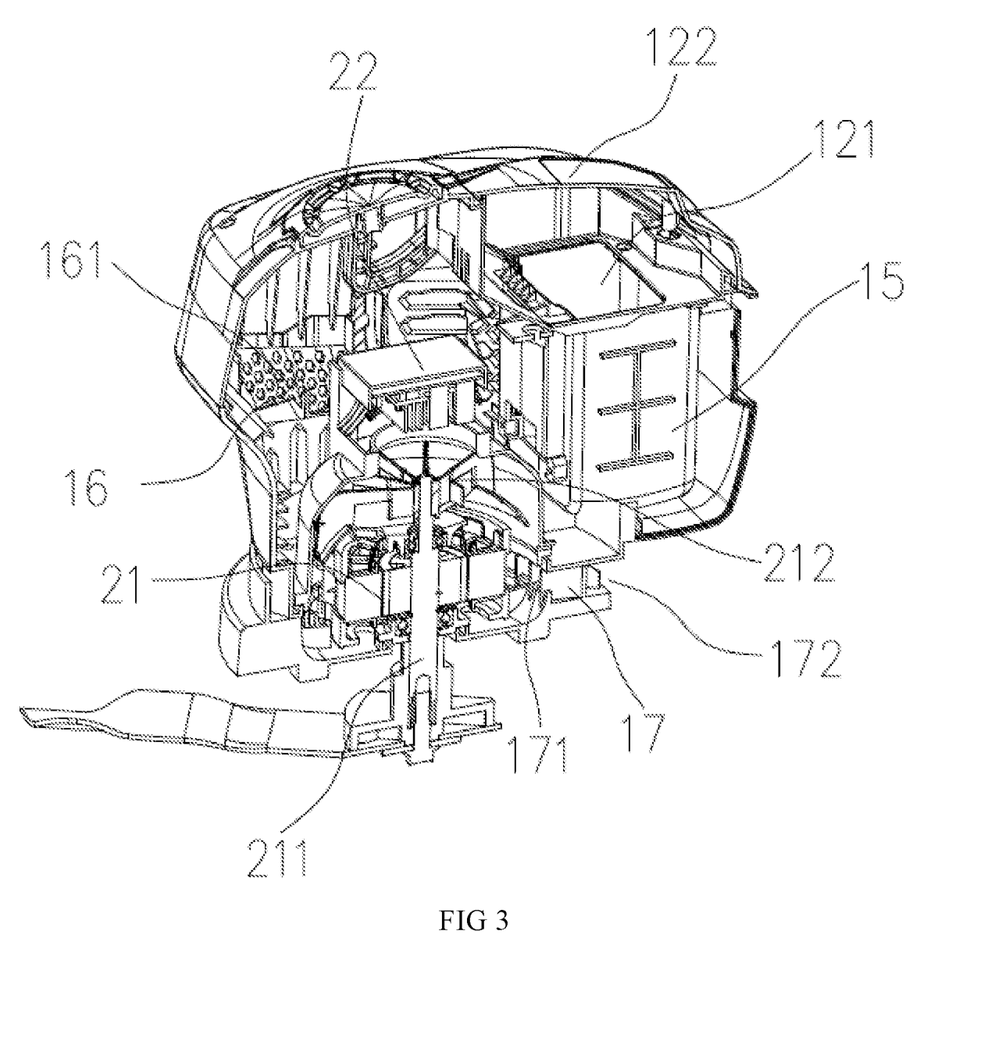
FIG. 3 is another cross-sectional view of the power assembly shown in FIG. 1.
Figure 4:
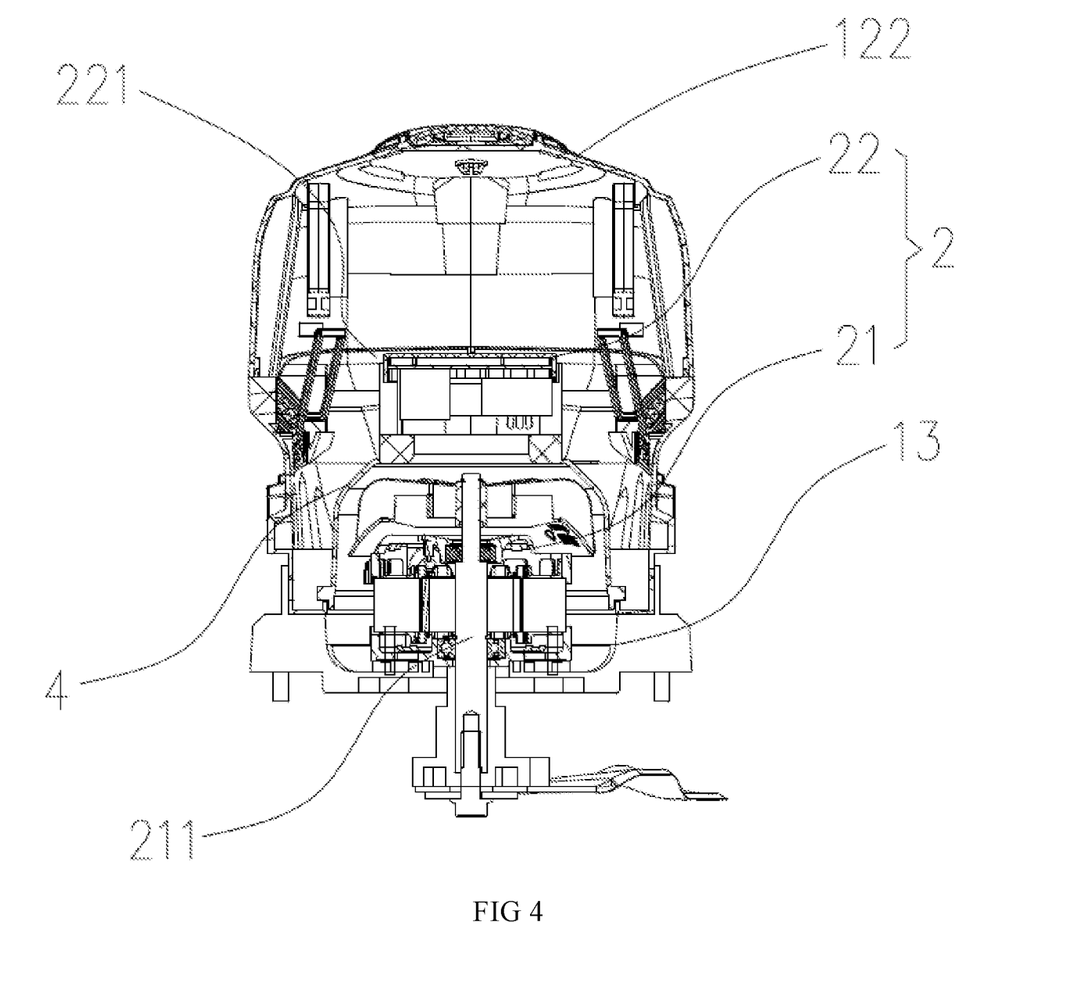
FIG. 4 is another cross-sectional view of the power assembly shown in FIG. 1.
Figure 5:
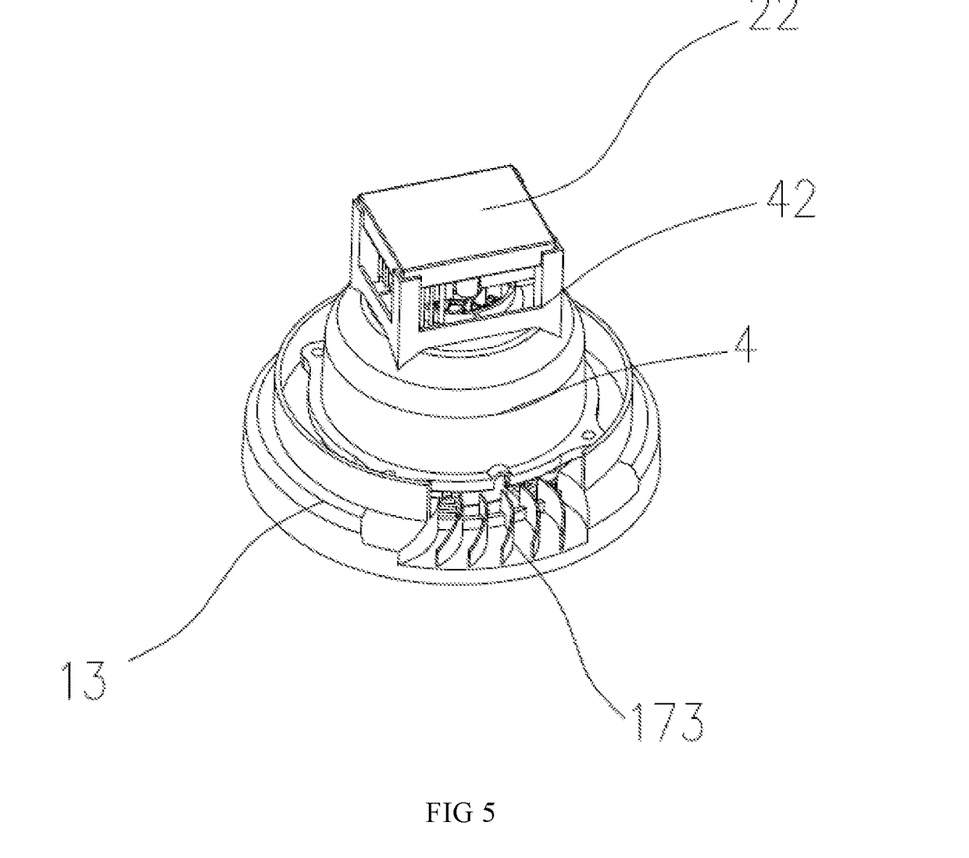
FIG. 5 is an assembly perspective view of a third casing, a driving unit and an air guiding cover shown in FIG. 1.
Figure 6:
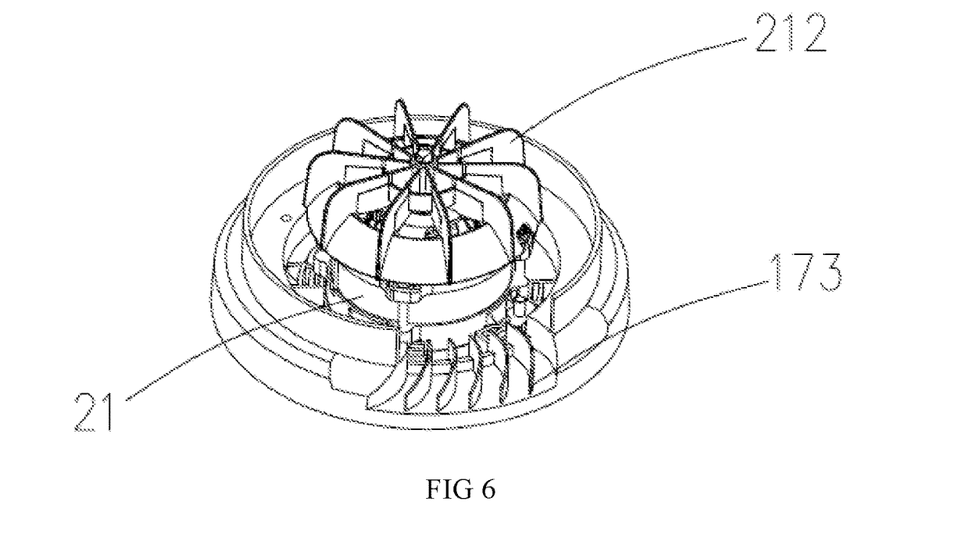
FIG. 6 is an assembly perspective view of the driving unit and the air guiding cover shown in FIG. 4.
Figure 7:
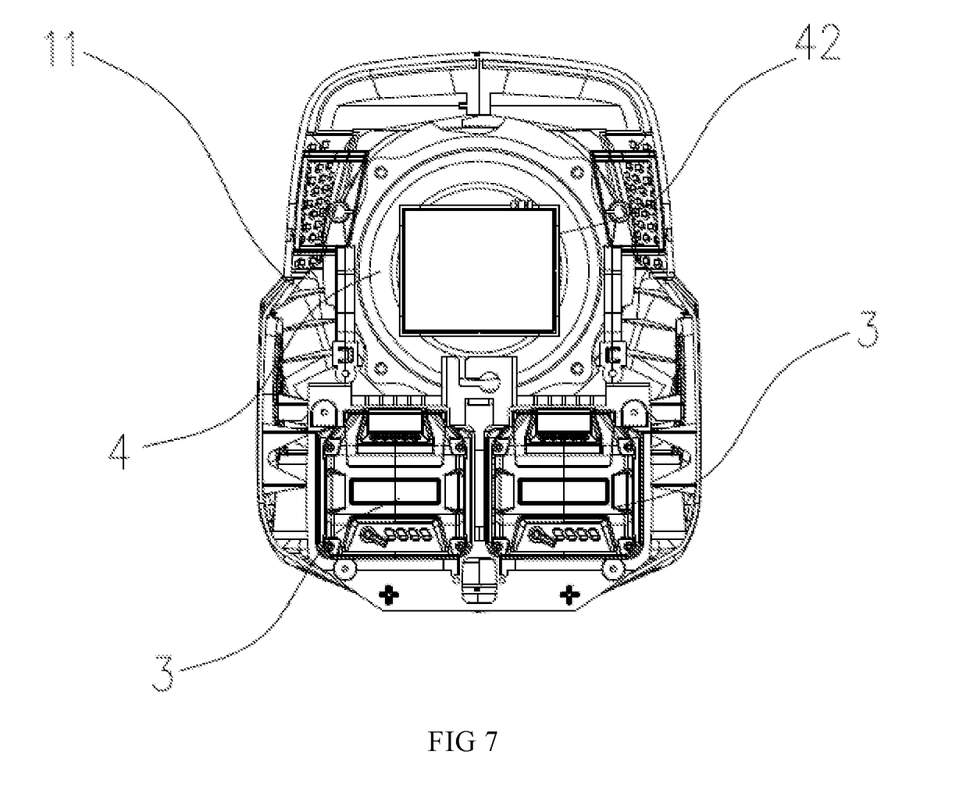
FIG. 7 is a top view of the power assembly without the second casing in accordance with the present invention.
Figure 8:
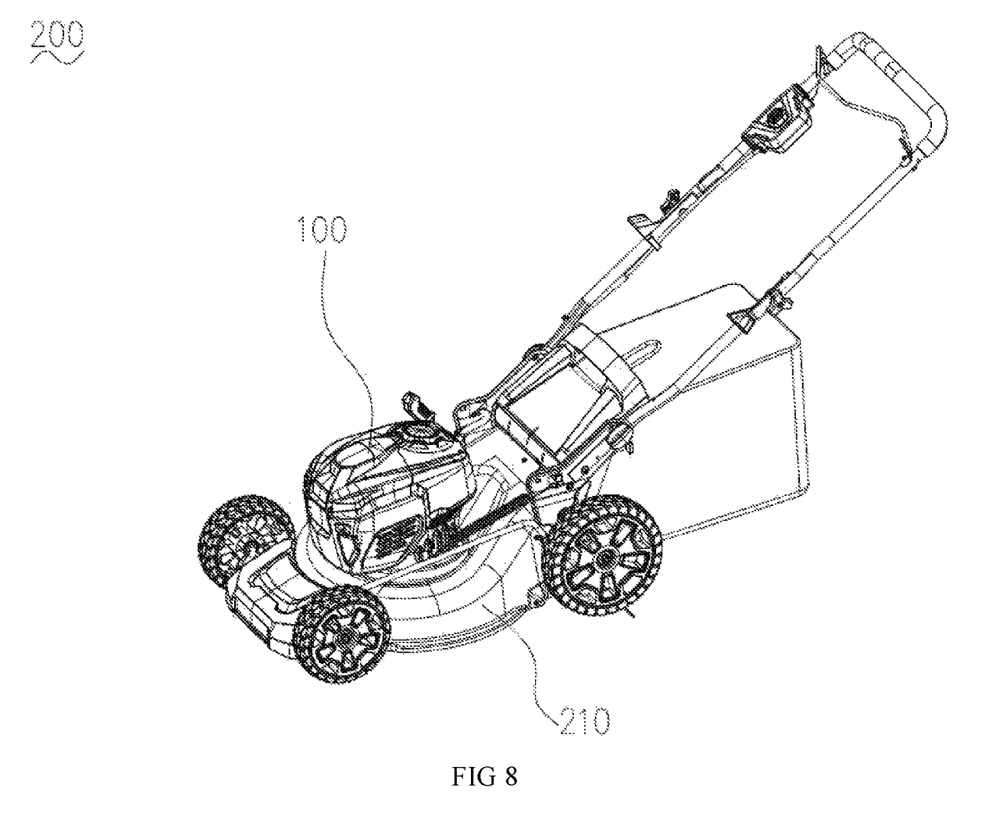
FIG. 8 is a perspective view of a garden tool in accordance with the present invention.
Figure 9:
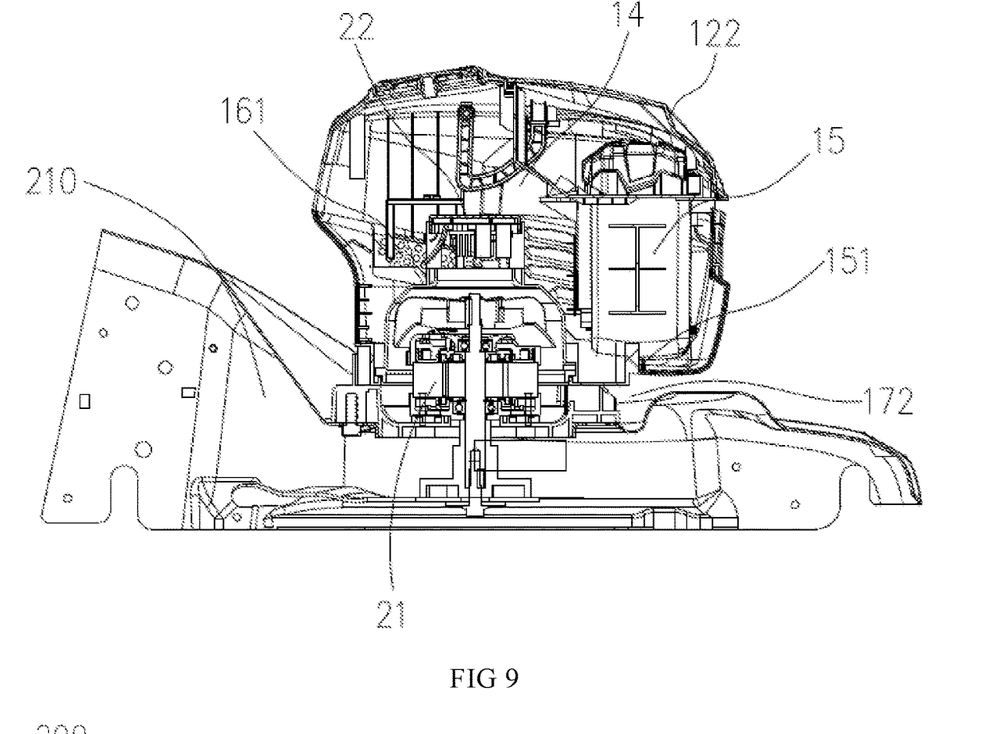
FIG. 9 is another perspective view of the power assembly shown in FIG. 7.
Figure 10:
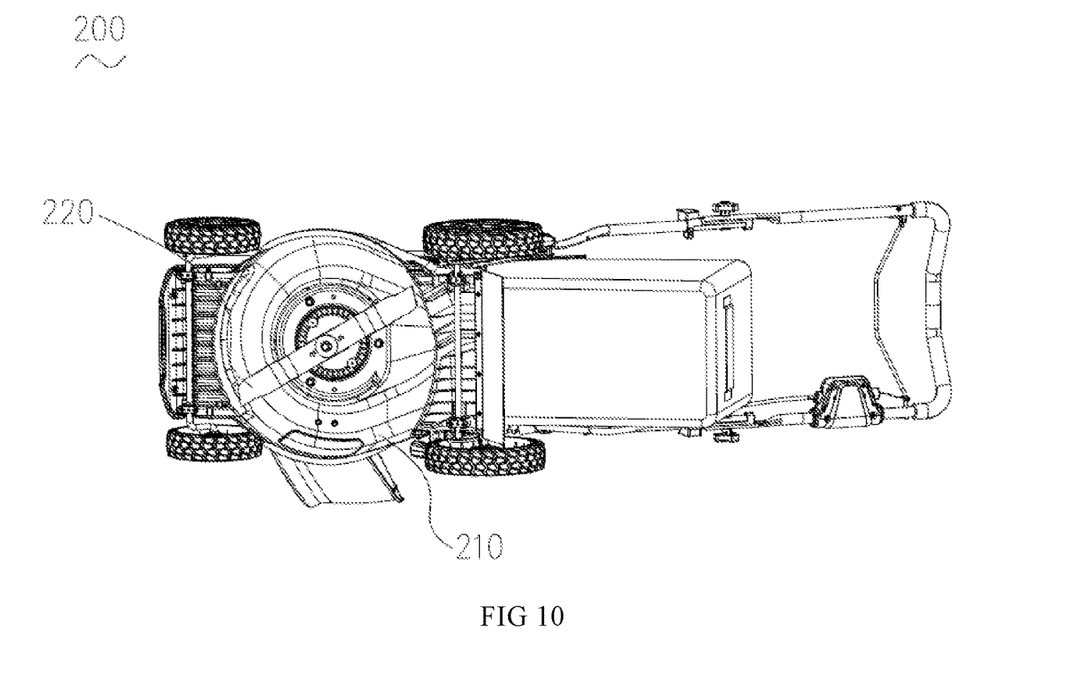
FIG. 10 is a cross-sectional view of the garden tool shown in FIG. 8, showing the power assembly cooperating with a chassis of the garden tool.

Please referring to FIG. 1, FIG. 2 and FIG. 7, a power assembly 100 mounted on a garden tool 200 to power the garden tool 200 comprises a casing 1, a driving unit 2 housed in the casing 1, a power supplying unit 3 mounted in the casing 1 for supplying power to the driving unit 2 and an air guiding cover 4 surrounding around the driving unit 2. The garden tool 200 is driven to work by the power supplying unit 3 when the power assembly 100 is connected thereto. In the present embodiment, there are two power supplying units 3, and it can be understood that the present invention protects at least one power supplying unit 3.

Referring to FIG. 1 to FIG. 8, the casing 1 comprises a first casing 11, a second casing 12 mounted to the first casing 11, and a third casing 13 disposed at the bottom of the first casing 11. The first casing 11 is configured with a hollow shape for the driving unit 2 passing therethrough. The second casing 12 is configured with a sheet shape and assembled on the top of the first casing 11. The air guiding cover 4 is sandwiched between the first and second casings 11, 12. The driving unit 2 is surround by the air guiding cover 4 and sandwiched between the guiding cover 4 and the third casing 13. It should be understood that, in the present invention, three parts of the casing 1 are assembled together from top to bottom. Specially, the first casing 11, the second casing 12 and the third casing 13 are sequentially arranged from top to bottom for illustrating, not for limiting the scope of the present invention, that is, in the present invention, the specific arrangement of the casing 1 is selected according to actual needs and is not limited herein.

A first receiving cavity 14 is formed between the first and second casings 11, 12 for receiving the driving unit 2 and the air guiding cover 4. A second receiving cavity 15 is also formed by the first and second casings 11, 12 for accommodating the power supplying unit 3. The second receiving cavity 15 is located adjacent to the first receiving cavity 14. The second receiving cavity 15 is provided with a plug interface (not shown) for electrically connecting with the power supplying unit 3 to output power. The second receiving cavity 15 is further provided with a plurality of venting holes 151 located at the bottom thereof for facilitating heat dissipation of the power supplying unit 3 and maintaining the power supplying unit 3 at a lower working temperature. In this embodiment of the present invention, the first and second receiving cavities 14, 15 are spaced apart with each other to ensure a stable working environment in the corresponding receiving cavity 14, 15. Of course, in other embodiments, the first and second receiving cavities 14, 15 can be communicated with each other to dissipate heat therein by flowing air.

The first casing 11 defines a plurality of first air passage 16 located at two sides thereof for guiding air into the first receiving cavity 14. Each first air passage 16 has a first air inlets (not shown) and a first air outlet 162. The first air inlet and the first air outlet 162 are disposed on the outer wall 111 of the first casing 11 for air passing through. The first air inlets and outlets 162 are located at two opposite sides of the first casing 11. The first air outlet 162 is open towards the driving unit 2 and has substantially the same height as the top of the driving unit 2, so as to reduce the internal temperature of the first receiving cavity 14 through sufficiently mixing the external air flow and the air in the first receiving cavity 14 when the external air flow passing through the first air outlet 162 along the first air passage 16 and entering into the first receiving cavity 14. A filter component may be disposed in the first air passage 16 for preventing debris or moisture from entering into the power assembly 100 and ensuring the safe use of the power assembly 100.

The second casing 12 is disposed above the first casing 11 for closing the first casing 11. In the present invention, the first and second casings 11, 12 are buckled with each other. The second casing 12 has a receiving hole 121 corresponding to the second receiving cavity 15 and an upper cover 122 disposed above the receiving hole 121. The power supplying unit 3 can pass through the receiving hole 121 to electrically connect with the plug interface in the second receiving cavity 15. The upper cover 122 has one end rotatably connected with the second casing 12 and the other end fastened to the second casing 12. The upper cover 122 is disposed on the outside the power supplying unit 3 to prevent the power supplying unit 3 from being exposed to the external environment, and also preventing water or foreign matters from entering into the second receiving cavity 15, so as to ensure the stable connection between the power supplying unit 3 and the plug interface.

The third casing 13 is assembled to the bottom of the first casing 11 for fixing the driving unit 2 and the air guiding cover 4 in the casing 1 when the power assembly 100 is assembled. Specifically, the third casing 13 is sealed to the first casing 11 for avoiding the washing water or other liquid entering the casing 1 through the gap located between the first and third casings 11, 13 to affect the work of the driving unit 2. The third casing 13 is not only used to fix the air guiding cover 4 in the first receiving cavity 14, but also used for fixing the power assembly 100 to the garden tool 200. Specifically, the third casing 13 has a connecting portion (not shown) cooperated with the garden tool 200 for achieving a stable connection between the power assembly 100 and the garden tool 200. And meanwhile the function of the power assembly 100 driving the garden tool 200 to work is also achieved. In this embodiment, the first and third casings 11, 13 are separated with each. But in other embodiment, the third casing 13 could be integrated with the first casing 11 as a whole.

The casing 1 is further provided with a second air passage 17 corresponding to the first air passage 16 for guiding the air out of the first receiving cavity 14. A cyclic heat dissipation air duct is formed in the casing 1 for dissipating heat of the power assembly 100. Both the first air passage 16 and the second air passage 17 are parts of the cyclic heat dissipation air duct of the power assembly 100. The second passage 17 surrounded by the first and third casings 11, 13 includes a second air inlet 171 located on a peripheral side of the third casing 13 and a second air outlet 172 corresponding to the second air inlet 171. The second air inlet 171 and the second air outlet 172 are located on the peripheral side of the third casing 13. The second air inlet 171 is located much closer to the middle of the third casing 13 than the second air outlet 172. A plurality of ribs 173 located in the second air passage 17 extend upwardly from the top of the third casing 13 for defining the airflow direction. The second air outlet 172 is located at a bottom of the second receiving cavity 15, so as to reduce the operating temperature of the power supplying unit 3 and increase the effectiveness of the power supplying unit 3 through the high-speed flowing air passing through the venting hole 151 of the second receiving cavity 15 to drive the air in the second receiving cavity 15 flow when the air passing through the second air outlet 172.

The driving unit 2 used for driving a garden tool 200 to work when the power assembly 100 connected to the garden tool 200 includes a driving motor 21 received in the air guiding cover 4 and a control panel assembly 22 mounted on the top of the air guiding cover 4. The driving motor 21 has a driving shaft 211 passing through the third casing 13 and a motor fan 212 located away from the driving shaft 211. The driving shaft 211 and the motor fan 212 are disposed at two opposite sides of the driving motor 21. The driving shaft 211 is connected to a working component (not shown) of the garden tool 200 to drive the garden tool 200. The motor fan 212 is coupled to a rotor of the driving motor 21. When the driving motor 21 is working, the motor fan 212 is driven to rotate by the driving motor 2. Under the rotation of the motor fan 212, the air firstly flows from the top to the bottom of the driving motor 21 along a gap formed between the guiding cover and the driving motor 21, and then flows out through the second air passage 17, so as to take away the heat generated by the driving motor 21 and reduce the working temperature of the driving motor 21 to avoid abnormal use of the driving motor 21 caused by high operating temperature. The motor fan 212 is an axial fan.

In the embodiment of the present invention, the ribs 173 in the second air passage 17 are deflected in the tangential direction of the rotation of the motor fan 212, so that the flow direction of the airflow passing through the second air passage 17 is consistent with the tangential direction of the rotation of the motor fan 212. Therefore, the flow rate of the air passing through the second air passage 17 is increased and the heat dissipation in the first receiving cavity 14 is increased.

The control panel assembly 22 is received in the first receiving cavity 14 and has substantially the same height as the first air outlet 162, so that the airflow passing through the first air outlet 162 flows through the control panel assembly 22 to carry away the heat generated by the control panel assembly 22 during operation. In the embodiment of the present invention, the control panel assembly 22 comprises a plurality of parallel arranged cooling fins 221 for increasing the heat dissipation area thereof. The first air outlet 162 and the cooling fins 221 are located at the same height with each other for increasing the heat dissipation rate of the control panel assembly 22.

The power supplying unit 3 used for supplying power to the power assembly 100 is a battery pack detachably connected to the plug interface of the second receiving cavity 15. The battery pack 3 has a plurality of regularly arranged battery cells and is configured with a regular shape for easily passing through the receiving hole 121 of the second casing 12 and being inserted into the second receiving cavity 15.

The air guiding cover 4 is mounted between the first and third casings 11, 13 and received in the first receiving cavity 14. The air guiding cover 4 defines an air guiding port 41 for communicating the internal space thereof and the first receiving cavity 14. The air guiding port 41 is located at the top of the air guiding cover 4. The control panel assembly 22 is located between the first air outlet 162 and the air guiding port 41, so that the airflow passes through the control panel assembly 22 to take away the heat generated by the control panel assembly 22 and the driving motor 21 when the airflow enters the inner space of the air guiding cover 4 from the first receiving cavity 14 and flows out the power assembly 100. The airflow enters the inner space of the air guiding cover 4 along the first air passage 16. The airflow flows out the power assembly 100 along the second air passage 17. The air guiding cover 4 also includes a plurality of supporting portions 42 extending upwardly therefrom. The air guiding port 41 is surrounded by the supporting portions 42. The control panel assembly 22 is supported by the supporting portions 42 when mounted to the air guiding cover 4. the control panel assembly 22 is located above the air guiding port 41.

When the power assembly 100 is operated, the driving motor 21 is turned on to drive the motor fan 212 to rotate. The outside air is driven by the motor fan 212 to firstly enter the first receiving cavity 14 through the first air inlet and the first air outlet 162 of the first air passage 16; and secondly enters the inner space of the air guiding cover 4 through the air guiding port 41 after contacting with the control panel assembly 22; and under the driving of the motor fan 212, thirdly enters from the top to the bottom of the driving motor 21 along the gap formed between the rotor of the driving motor 21 and the air guiding cover 4; finally flows out along the second passage 17 formed between the first and third casings 11, 13. The heat caused by the operation of the driving motor 21 and the control panel assembly 22 is taken away by the flowing airflow in the casing 1. Therefore, the operating temperature of the driving motor 21 and the control panel assembly 22 is reduced to ensure the driving motor 21 and the control panel assembly 22 work in a good working environment. The second air outlet 172 is located below the second receiving cavity 15 and the venting hole 151 is located at the bottom of the second receiving cavity 15, so that the heat caused by the power supplying unit 3 can be taken away by the high-speed flowing air passing through the venting hole 151 and driving the air in the second receiving cavity 15 flow and the working temperature of the power supplying unit 3 is reduced and the working efficiency of the power supplying unit 3 is improved. Meanwhile the power supply unit 3 has a stable output and a high output power. In particular, when the power supplying unit 3 is a lithium-based battery, the use of the power assembly 100 can significantly overcome the insufficient power of the lithium battery product caused by excessive working temperature and expand the apply of the power supplying unit 3.

Please referring to FIGS. 8 to 10 and FIG. 1, the garden tool 200 in accordance with the present invention comprises a chassis 210, a working component 220 receiving in the chassis 210, and a power assembly 100 for driving the working component 220. The power assembly 100 is steady mounted on the chassis 210 through the connecting portion of the third casing 13 thereof cooperating with the corresponding portion of the chassis 210. The driving shaft 211 of the driving motor 21 is connected to the working component 220 when passing through the third casing 13 and the chassis 210. The working component 220 is driven to work under the rotation of the driving motor 21.

The first air inlet is located at an upper peripheral of the first casing 11 and the second air outlet 172 is located between the first casing 11 and the chassis 210 when the power assembly 100 is assembled to the garden tool 200, so as to avoid the cleaning liquid entering into the power assembly 100 through the first air inlet or the second air outlet 172 when using high-pressure water gun clean the flipped garden tool 200. Therefore, short circuit of the power assembly 100 is avoided and the garden tool 200 is easy to clean and safe to use.

After the garden tool 200 is used, the garden tool 200 can be turned over, and the working component of the garden tool 200 is cleaned using a high pressure water gun. At this time, the cleaning liquid for cleaning is blocked by the bottom case 210, so the cleaning liquid cannot enter the power assembly 100 through the first air inlet and/or the second air outlet 172. On one hand, the cleaning of the garden tool 200 is facilitated, and the service life of the garden tool 200 is improved; on the other hand, the occurrence of problems such as short circuit and fire caused by the entry of the cleaning liquid into the power assembly 100 is effectively prevented, and the purpose of improving the safety of the garden tool 200 is achieved.

It should be noted that the power assembly 100 is a replaceable component and can be detachably connected to the garden tool 200. The power assembly 100 has the same/similar function as that of the small internal combustion engine, and can be applied to various small engine-driven garden tools such as lawn mowers, snow sweepers, washing machines and ripper etc. In the description of the present invention, only the garden tool 200 is exemplified as a lawn mower, but it should not be limited thereto.

In summary, the power assembly 100 of the present invention provides the airflow entering the interior of the casing 1 through the first air passage 16 through the control panel assembly 22 and the driving motor 21 by setting the arrangement and position of the first air passage 16 and the second air passage 17, and finally flowing out of the casing 1 through the second air passage 17, timely and effectively generating heat when the driving motor 21 and the control panel assembly 22 work, effectively preventing the driving motor 21 and the control panel assembly 22 from being abnormal used due to the service temperature is too high. Due to the first and second air passages 16, 17 of the power assembly 100, the heat generated by the driving motor 21 and the control panel assembly 22 during operation can be promptly taken away by the airflow passing through the first air passage 16, the control panel assembly 22, the driving motor 21 and flowing out the casing 1 along the second air passage 17. Therefore, the abnormal use of the driving motor 21 and the control panel assembly 22 is overcome. The garden tool 200 can have a good heat dissipation performance, a high working power, a good waterproof performance and is convenient for cleaning and safe to use. In addition, because the second air outlet 172 is located below the second receiving cavity 15, so that the heat generated by the power supplying unit 3 can be taken away promptly by the airflow passing through the venting hole 151, the working temperature of the power supplying unit 3 can be reduced and the working efficiency of the power supplying unit 3 can be improved.

The above embodiments are only used to illustrate the technical solutions of the present invention, not for limitation. Although the present invention is described in detail with reference to the preferred embodiments, ordinary technicians in the field should understand that the technical solutions of the present invention may be modified or substituted without departing from the spirit and scope of the technical solutions of the present invention.

The invention claimed is:

1. A power assembly, comprising:
   a housing,
   a driving unit received in the housing and including a driving motor and a control panel assembly located upon the driving motor, and
   a power supplying unit received in the housing for powering the driving unit,
   wherein the housing has at least one heat dissipation air duct formed therein for airflow passing through the driving unit, and wherein the heat dissipation air duct has an air inlet for air intaking and an air outlet for air flowing out, and wherein the air outlet is located at a bottom of the housing and open towards a lateral side of the housing, and wherein the power assembly is a replaceable component and can be detachably connected to a garden tool.

2. The power assembly according to claim 1, wherein the heat dissipation air duct has a first air passage for airflow passing through, and wherein the first passage has a first air inlet and a first air outlet disposed at two opposite ends thereof, and wherein the first air inlet is the air inlet disposed on a side of the housing, and wherein the first air outlet is open towards the driving unit.

3. The power assembly according to claim 2, wherein the first air outlet is open towards the control panel assembly and located as same height as the control panel assembly.

4. The power assembly according to claim 2, wherein the heat dissipation air duct has a second air passage communicating with the first air passage for air flowing out, and wherein the second passage includes a second air inlet and a second air outlet located at two opposite ends thereof, and wherein the second air outlet is the air outlet open towards the lateral side of the housing.

5. The power assembly according to claim 4, wherein the housing has a plurality of ribs located in the second air passage for determining the flowing direction of the airflow, and wherein the second air inlet is disposed at the bottom of the housing.

6. The power assembly according to claim 4, wherein the power assembly includes an air guiding cover located in the heat dissipation air duct, and wherein the driving motor is surrounded by the air guiding cover and the control panel assembly is disposed at the top of the air guiding cover.

7. The power assembly according to claim 6, wherein the air guiding port has a plurality of supporting portions extending upwardly therefrom for supporting the control panel assembly.

8. The power assembly according to claim 7, wherein the air guiding cover has an air guiding port disposed at the top thereof, and wherein the air guiding port is surrounded by the supporting portions, and wherein the control panel assembly is located between the air guiding port and the first air outlet.

9. The power assembly according to claim 8, wherein the housing has a first and second receiving cavities adjacent to each other, and wherein the driving unit and the air guiding cover are received in the first receiving cavity, and wherein the power supplying unit is received in the second receiving cavity.

10. The power assembly according to claim 9, wherein the second receiving cavity is communicating with the first receiving cavity and wherein the housing has a venting hole located at a bottom of the second receiving cavity for the airflow flowing out.

11. A garden tool operable for use with the power assembly of claim 1, comprising a chassis and a working assembly received in the chassis and driven by the power assembly, and wherein the air inlet and air outlet of the power assembly are located above the chassis and the air outlet is open towards a lateral side of the chassis.

\* \* \* \* \*